United States Patent
Hohmann, Jr.

(10) Patent No.: US 7,823,355 B1
(45) Date of Patent: *Nov. 2, 2010

(54) NONMETALLIC MASONRY FLASHING

(75) Inventor: Ronald P. Hohmann, Jr., Hauppauge, NY (US)

(73) Assignee: Mitek Holdings, Inc., Wilmington, DE (US)

( * ) Notice: Subject to any disclaimer, the term of this patent is extended or adjusted under 35 U.S.C. 154(b) by 1060 days.

This patent is subject to a terminal disclaimer.

(21) Appl. No.: 11/203,769

(22) Filed: Aug. 15, 2005

Related U.S. Application Data (63) Continuation-in-part of application No. 10/427,050, filed on Apr. 30, 2003, now Pat. No. 6,928,780, which is a continuation-in-part of application No. 10/426,135, filed on Apr. 29, 2003, now Pat. No. 6,945,000, and a continuation-in-part of application No. 10/143,484, filed on May 10, 2002, now Pat. No. 6,584,746.

(51) Int. Cl.
E04C 1/40 (2006.01)
(52) U.S. Cl. .................. 52/513; 52/61; 52/62; 52/383; 52/302.6; 428/295.1; 428/297.1; 428/297.4
(58) Field of Classification Search .................. 52/513, 52/61–62, 383, 302.1, 302.6; 428/295.1, 428/297.1, 297.4; 156/40
See application file for complete search history.

(56) References Cited

U.S. PATENT DOCUMENTS

| | | | |
|---|---|---|---|
| 3,728,195 A | 4/1973 | Bolles | |
| 4,239,795 A | 12/1980 | Haage et al. | |
| 4,295,911 A | 10/1981 | Haage et al. | |
| 4,396,665 A | 8/1983 | Rowe | |
| 4,657,958 A * | 4/1987 | Fieldhouse et al. | 524/247 |
| 4,686,803 A | 8/1987 | Couderc et al. | |
| 4,755,409 A | 7/1988 | Harkness | |
| 4,762,744 A | 8/1988 | Woiceshyn et al. | |
| 4,775,567 A | 10/1988 | Harkness | |
| 4,910,931 A | 3/1990 | Pardue, Jr. | |
| 5,106,447 A | 4/1992 | Di Rado et al. | |
| 5,634,310 A | 6/1997 | Hohmann | |

(Continued)

OTHER PUBLICATIONS

Fiberweb Flashing and Vapor Barrier Systems, Copper Aquaflash, specification sheet (publication date unknown), 2 pp.

(Continued)

*Primary Examiner*—Richard E Chilcot, Jr.
*Assistant Examiner*—Chi Q Nguyen
(74) *Attorney, Agent, or Firm*—Siegmar Silber, Esq.

(57) ABSTRACT

A nonmetallic masonry flashing is disclosed. The flashing includes a laminate that is applicable to cavity walls and particularly masonry block walls. The flashing has an adhesive layer which is a pressure activated, hot melt adhesive with various additives. The additives provide reinforcement to the entire structure and uses fiber glass or filamentous fragments of polypropylene. These additives are admixed into the hot melt adhesive. The nonmetallic masonry flashing employs peel-and-stick technology. After removal of a release sheet, the adhesive layer is pressed against the rough surface of the masonry block. The pressure activation creates a durable bond with the masonry block. Incorporated into the nonmetallic masonry flashing are various high-strength, polymeric laminates. The high-strength of the polymeric laminates is derived from advances in cross-lamination and laminates having a scrim as a core component.

17 Claims, 4 Drawing Sheets

U.S. PATENT DOCUMENTS

| | | |
|---|---|---|
| 5,860,259 A | 1/1999 | Laska |
| 5,870,864 A | 2/1999 | Snyder |
| 6,035,582 A | 3/2000 | Pacific |
| RE36,676 E | 5/2000 | Sourlis |
| 6,167,660 B1 | 1/2001 | Sama |
| 6,224,700 B1 * | 5/2001 | Oakley ........................ 156/71 |
| 6,584,746 B1 * | 7/2003 | Hohmann et al. ............. 52/513 |
| 6,912,820 B2 * | 7/2005 | Sourlis ...................... 52/302.1 |
| 6,928,780 B1 * | 8/2005 | Hohmann et al. ............. 52/513 |
| 6,945,000 B1 * | 9/2005 | Hohmann et al. ............. 52/513 |
| 6,964,136 B2 * | 11/2005 | Collins et al. ................. 52/209 |
| 7,216,460 B2 * | 5/2007 | Sourlis ...................... 52/169.5 |
| 7,603,816 B1 * | 10/2009 | Hohmann, Jr. ............... 52/101 |

OTHER PUBLICATIONS

Sandell Mfg. Co, Inc., Rubber-Seal Flashing, Product Catalogue Sheet (Schenectady, NY, publication date unknown), 4 pp.
Firestone, FlashGard, Product Specification Sheet (publication date unknown), 2 pp.
Hohmann & Barnard, Inc., Product Catalog (Hauppage, NY, 2002), pp. 18-20.
Dur-O-Wal, Inc., Product Catalog (Aurora, II, 2000), p. 14.
Wire Bond Corp., Product Catalog (Charlotte, NC, 2002/2003), pp. 18-19.
Hyload, Inc., Product Catalog (Wadsworth, OH, 1996).
York Mfg, Inc., Product Catalog (Sanford, ME, undated).
Advanced Bldg Products, Inc., (Springdale, ME, undated).
Sandell Mfg Co., Inc., (Schenectady, NY, undated).

* cited by examiner

NONMETALLIC MASONRY FLASHING

RELATED APPLICATION

This application is a continuation-in-part of a patent application entitled Metal Foil/Scrim Flashings bearing Ser. No. 10/427,050 and filed Apr. 30, 2003, now U.S. Pat. No. 6,928,780 issued Aug. 16, 2005, which in turn, was a continuation-in-part of a patent application entitled Metal Foil Masonry Flashings and Termination Bar Therefor bearing Ser. No. 10,426,135, filed Apr. 29, 2003 now U.S. Pat. No. 6,945,000 and of a patent application entitled Masonry Flashing Systems, bearing Ser. No. 10,143,484, filed May 10, 2002, now U.S. Pat. No. 6,584,746 issued Jul. 1, 2003.

BACKGROUND OF THE INVENTION

1. Field of the Invention

This invention relates to an improved flashing system for cavity wall structures, and more specifically to peel-and-stick nonmetallic masonry flashings and more particularly to polymeric flashings utilizing pressure-activated adhesives with optional fibrous reinforcement.

2. Description of the Prior Art

In the past, investigations relating to cavity wall flashing systems for brick veneer masonry construction have been conducted. While strides have been made in flashing-related technologies, including metal foils, elastomeric materials and hot melt adhesives, there still remain several areas where continued development is ongoing.

The inventors' patents and their assignee's product line are all related to accessories for cavity wall structures and include insulation, and anchoring and seismic devices, and are sold under the trademarks of Seismiclip®, Byna-Tie®, and DW-10-X®. These products, which are manufactured by Hohmann & Barnard, Inc., Hauppauge, N.Y. 11788, have become widely accepted in the industry and have provided the inventors with particular insight into the technological needs of this marketplace.

Masonry walls with brick veneer are designed with an inner and an outer wythe and a cavity therebetween. The masonry block inner wythe and insulation thereon isolates the interior of the building from the environment, while the brick veneer outer wythe provides an aesthetic finish to the building. The walls of a building are constructed to exclude water and water vapor from the interior. Since the presence of excessive levels of water or water vapor in the cavity hastens the deterioration of building materials, various masonry flashing systems have been adopted.

Because of widespread usage and familiarity with bituminous and asphaltic products in roofing applications, when masonry flashing systems were first designed, the building construction industry adopted the familiar copper and asphalt products. At that time the technology of pressure-sensitive hot melt adhesives needed for peel-and-stick applications was insufficiently developed. Some critics indicated that the tackiness of the adhesive was insufficient for the rough masonry block surfaces. Because of the presence of plasticizers, others were apprehensive about the available hot melt adhesives meeting the requisite fire retardancy standards. Also, to provide fire retardancy, some pressure-sensitive products were marketed for building construction use with inorganic fillers, such as alumina trihydrate, antimony oxide or calcium carbonate. However, these filled pressure-sensitive products had disadvantages, such as application problems, phase separation, toxicity, and reduced adhesion upon activation.

Prefabricated peel-and-stick flashing materials have been proposed, such as those shown in Harkness, U.S. Pat. No. 4,775,567 (see infra). These materials have included layers of bitumen and of compound bitumen for adhering the materials to the exteriors of masonry walls. While, under ideal circumstances, these peel-and-stick materials were easy to apply, the patent literature indicates that these materials did not conform well to irregular surfaces. Thus, the prior art bitumens used to secure these flashing materials to masonry walls often lacked the tackiness to bond tightly and durably to the wall surfaces. On occasion, when ambient temperatures were high, the bituminous materials drooled marring the aesthetics of the brick veneer.

In the past, the previously mentioned assignee hereof has distributed, under the Copper Aqua Flash membrane name, a line of composite flexible flashings. The composite, in one form thereof, is 50 mil. thick and consists of a 3-ounce, solid sheet of annealed copper laminated on one side to a polyester film and bonded on the other with a highly adhesive SBS modified bitumen (rubberized asphalt) with a peel-and-stick silicone top sheet. By completely encapsulating the copper in the polyester film on one side and rubberized asphalt on the other, the copper is protected from corrosion by alkaline or acidic solutions. Although the rubberized asphalt virtually eliminated the possibility of non-adhered areas, the Copper Aqua Flash membrane still had some of the previously described disadvantages of a bitumen-based flashing system.

Despite these early efforts, developing the right combination of materials and methods for flashing cavity walls in a fast and efficient manner has proved elusive. In addition to the above described technical problems, because there is frequently a delay between erecting the inner wythe and the outer wythe, the flashing installed on the inner wythe is often exposed to substantial ultra-violet radiation. Thus, standards similar to ASTM Specification G154 need to be met by masonry flashing systems.

As flashing for cavity walls involves numerous technological considerations, including, but not limited to, tensile strength, puncture- and tear-resistance; UV exposure, water absorption, pliability, peel and lap adhesion, and flammability, various industry standards under ASTM have arisen which serve as a guide to flashing manufacturers, architectural engineers, and others preparing and meeting construction specifications. Among the relevant ASTM standards are ASTM D 624, Standard test method for tear strength of . . . thermoplastic elastomers; ASTM D 412, Standard test method for . . . thermoplastic elastomers—tension; ASTM D 2240, Standard test method for rubber property—durometer hardness (applies to thermoplastic elastomers); and, ASTM G 154, Standard practice for operating fluorescent light apparatus for UV exposure of nonmetallic materials.

The inventors hereof have in the related inventions cited hereinabove made strides towards resolving some of the problems just described. Hohmann et al., U.S. Pat. Nos. 6,584,746, issued Jul. 1, 2003, and 6,925,728 issued Aug. 16, 2005 provide masonry flashing systems which are suitable either for surface-mounting with a termination bar or for through-wall mounting. The device used state-of-the-art clear hot melt adhesives and a reinforced elastomeric composite.

In preparing for this application the following patents came to the attention of the inventors and are believed to be relevant to the further discussion of the prior art:

| U.S. Pat. No. | Inventor | Issue Date |
|---|---|---|
| 6,584,746 | Hohmann et al. | Jul. 1, 2003 |
| 6,224,700 | Oakley | May 1, 2001 |
| 6,035,582 | Pacific | Mar. 14, 2000 |
| 5,870,864 | Snyder | Feb. 16, 1999 |
| 5,860,259 | Laska | Jan. 19, 1999 |
| 4,910,931 | Pardue | Mar. 27, 1990 |
| 4,775,567 | Harkness | Oct. 4, 1988 |
| 4,755,409 | Harkness | Jul. 5, 1988 |
| 4,295,911 | Haage et al. | Oct. 20, 1981 |
| 4,239,795 | Haage et al. | Dec. 16, 1980 |

Oakley—U.S. Pat. No. 6,224,700—Issued May 1, 2001

Oakley in U.S. Pat. No. 6,224,700 (assigned to Mar-Flex Systems, Inc., Middletown, Ohio) describes a method of applying a composite material to an above-grade building component to form a tacky non-swelling elastomeric membrane. Thereafter, a flexible, non-porous polymeric sheet is pressed onto the tacky exterior of the elastomeric membrane. The polymeric sheet is stronger than the elastomeric membrane and protects the elastomeric membrane from punctures or tears. Here, in situ construction is both labor intensive and requires special equipment for installation.

Pacific—U.S. Pat. No. 6,035,582—Issued Mar. 14, 2000

Pacific describes a flashing material which includes a sheet layer of copper, aluminum or other metal or a thin sheet of unreinforced plastic. Here it appears that in situ adhesives are applied.

U.S. Pat. No. 5,870,864—Snyder—Issued Feb. 16, 1999

Snyder describes a drainage system employing water collection pans which for insertion into the interior cavities of masonry block units over the length of a selected block wall course for collecting the water drained through the interior cavities of the upper courses and directing water to the exterior of the wall.

U.S. Pat. No. 5,860,259—Laska—Issued Jan. 19, 1999

Laska describes an insulated drainage panel for use in cavity wall or veneer wall construction which panel includes a planar insulating board with a porous structure thereof.

U.S. Pat. No. 4,910,931—Pardue—Issued Mar. 27, 1990

In the Pardue patent, a water collection and drainage system is described for a masonry block wall having bond beam block courses and intervening standard block courses. A system of upper water collection pans is supported along each upper bond beam course. Downspouts leading from drain openings in the upper collection pans drain collected from the pans through the vertical block cavities in lower block courses to the next lower series of collection pans. Weeping spouts lead laterally from the base collection pans to the exterior of the wall to continuously drain collected water from the interior wall cavities.

U.S. Pat. Nos. 4,775,567 and 4,755,409—Harkness—Issued Oct. 4, 1988 and Jul. 5, 1988, Respectively.

A waterproofing laminate suitable for use in roofs, floors or other surfaces where waterproofing is desired contains a reinforcing sheet, first and second bitumen layers secured to opposite surfaces of the reinforcing sheet, first and second compound bitumen layers secured to the bitumen layers, an elastomeric sheet secured to the first compound bitumen layer and a release sheet secured to the second compound bitumen layer. Certain preferred materials for use in the laminate are recited.

U.S. Pat. Nos. 4,295,911 and 4,239,795—Haage et al.—Oct. 20, 1981 and Dec. 16, 1980, Respectively.

A protective covering for the protection of surface seals against mechanical damage in building constructions and other civil engineering constructions which comprises a composite of an elastic, waterproof thermoplastic synthetic resin film sheet and/or synthetic resin layer and a lattice-like fabric having knot couplings or points of intersection of the threads that yield under the effect of a load.

The nonmetallic masonry flashing system of this invention includes a selected group of laminates forming a polymeric membrane with pressure-activated adhesive thereon, and a release sheet for peel-and-stick mounting in the cavity between the inner wythe and the outer wythe as described infra. Additionally, the adhesive layer has been doped with fibrous material to increase the overall strength of the construct. The structure of this invention has been found to obviate the difficulties discussed above and provides other advantages as set forth herein.

SUMMARY

In general terms, the nonmetallic masonry flashing disclosed hereby includes a laminate for flashing. The laminated flashing is particularly applicable to cavity walls such as a wall with an inner wythe of masonry block and an outer wythe or veneer of brick. The flashing laminate also includes an adhesive layer which is described hereinbelow as including a pressure activated, hot melt adhesive and various additives. In some embodiments, the additive is selected for the purpose of providing reinforcement to the entire structure. To accomplish this, a fibrous component, such as fiber glass or filamentous fragments of polypropylene are admixed into the hot melt adhesive. The nonmetallic masonry flashing hereof takes advantage of peel-and-stick technology and, after removal of a release sheet, the adhesive thereon is pressed against the rough surface of the masonry block. The pressure activation creates a durable bond with the inner wythe.

Incorporated into the nonmetallic masonry flashing are various high-strength, polymeric laminates. The high-strength of the polymeric laminates is derived from advances in cross-lamination technology and laminates having a scrim as a core component. As to cross-laminates two forms are employed—namely, as a two-layer form and a multilayer form. In the two-layer form, two plastic films are combined so that the directions of orientation of the films are at a 90° angle the one to the other. In the multilayer form, a preformed central lamina has extruded thereon two outer plastic films. The direction of orientation of each successive layer is 90° from the prior layer. The laminated scrim structure hereof has a woven high-density polyethylene scrim with a coating on both sides of low-density polyethylene.

The peel-and-stick technology shown herein enables quick and sure flashing of cavity walls which was unavailable prior to the advances in the materials of both polymeric membranes and hot melt adhesives. The detailed description of these materials is provided hereinbelow.

OBJECTS AND FEATURES OF THE INVENTION

It is an object of the present invention to provide, for cavity wall construction, a nonmetallic masonry flashing.

It is a further object of the present invention to provide for mounting on the exterior surface of the inner wythe a cross-laminated polymeric membrane and to coat the flashing with a pressure-activated adhesive which, upon installation, strongly adheres to the rough and porous surfaces of the masonry block and of the brick.

It is another object of the present invention to provide in a nonmetallic masonry flashing for cavity wall construction, combining hot melt adhesive and polymeric membrane technologies in a device free of bituminous or asphaltic coatings, which flashing resists drooling, tearing and puncturing.

It is yet another object of the present invention to provide a labor-saving nonmetallic masonry flashing which utilizes peel-and-stick components that are easy and economical to install in cavity wall constructs having a masonry block inner wythe and a brick outer wythe.

It is still yet another object of the present invention to provide a nonmetallic masonry flashing which operates cooperatively with present flashing accessories such as mortar guards and weep hole fittings.

It is a feature of the present invention that the hot melt adhesive hereof is compatible with cross-laminated flashing membranes hereof and meets industry flammability standards.

It is another feature of the present invention that the nonmetallic flashing membrane hereof is highly, ultraviolet resistant and the cross-lamination of the membrane enhances tear and puncture resistance.

It is yet another feature of the present invention that when the hot melt adhesive is doped with fibrous reinforcement, the bonding of the flashing with the inner wythe is strengthened and the overall device strength is enhanced.

Other objects and features of the present invention will become apparent upon reviewing the drawing and reading the detailed description which follows.

BRIEF DESCRIPTION OF THE DRAWINGS

In the following drawings, the same parts in the various views are afforded the same reference designators.

DESCRIPTION OF THE PREFERRED EMBODIMENTS

In the nonmetallic masonry flashing system of this invention, pressure-activated hot melt adhesives and adhesive blends are used to attach high-strength polymeric composite material to the cavity face of the masonry inner wythe and to the upper surface of a course of brick outer wythe. The nonmetallic masonry flashing is emplaced behind the insulation which, in turn, serves to protect against thermal losses, to reduce sound, and to prevent water vapor condensing on colder surfaces. In the embodiments shown, three different types of polymeric composites are combined with three different adhesive formulations. Each flashing is constructed to increase the life of the structure by enhancing the tensile strength and by improving tear and puncture resistance.

In the first embodiment a two-layer, cross-laminated web of flashing is combined with a pressure-activated adhesive and after peeling off a release sheet, is applied to the cavity wall. The layers are formed from polymer blends that are sufficiently incompatible so as to form upon extrusion a microscopically visible grain. Even though creating a grain in the lamina weakens the respective lamina, upon uniting the layers in a common sheet with the grain direction of adjacent layers being in a criss-crossing relationship, a membrane of superior strength is formed.

In contradistinction to the related cases, the role of the adhesive hereof is changed in emphasis in that optionally a structurally strengthening, fiber-doped adhesive is used. Such adhesives not only have sufficient tack to adhere to masonry block, but also have substantial reinforcement that adds to the strength of the overall assemblage.

Figure 1:
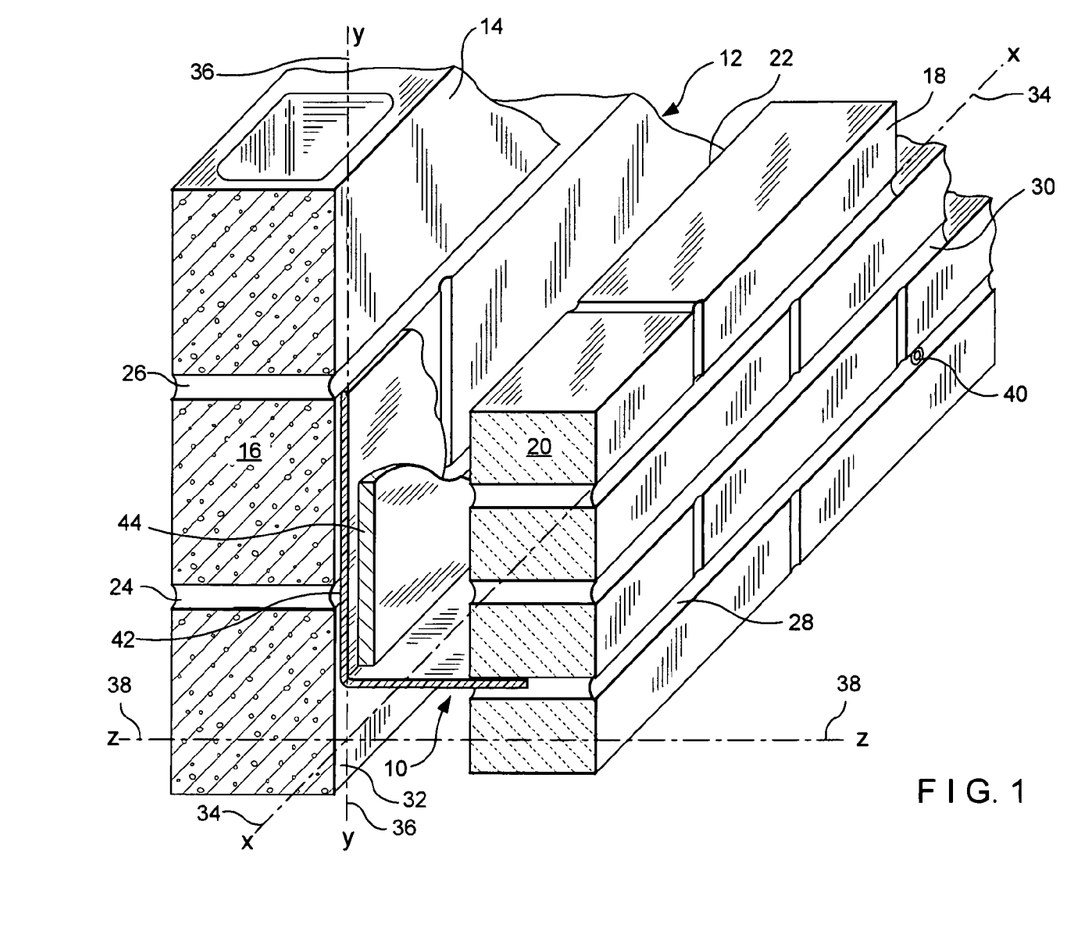
FIG. 1 is a perspective view of a first embodiment of a nonmetallic masonry flashing of this invention and shows a cavity wall with an interior wythe of masonry block and an exterior wythe of brick having a surface-mounted flashing membrane installed in the cavity thereof.
Figure 2:
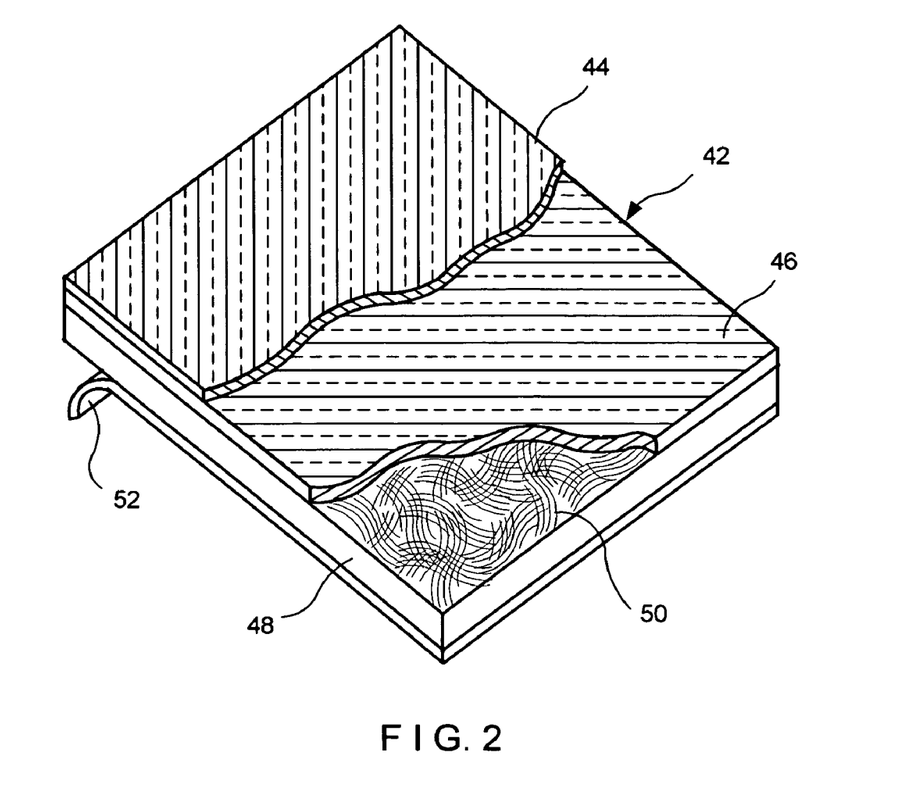
FIG. 2 is a perspective view of the uninstalled peel-and-stick flashing two-layer, cross-laminated membrane of FIG. 1 with successive laminae partially broken away to show details of the structure thereof.
Figure 3:
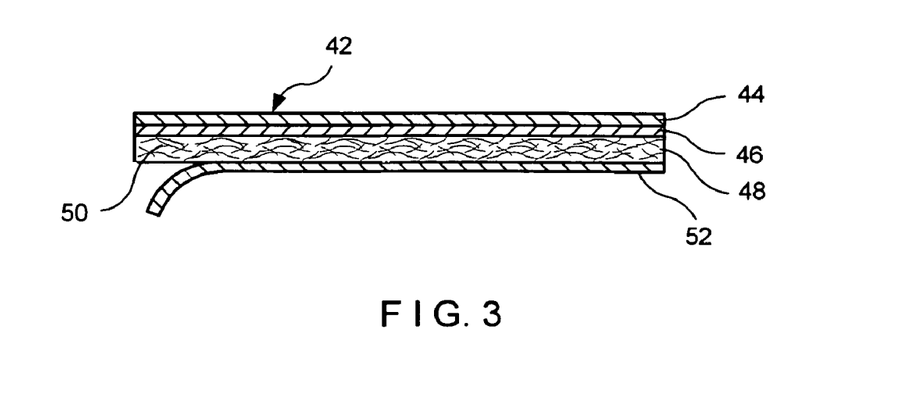
FIG. 3 is a cross-sectional view of the flashing membrane of FIG. 2.

Referring now to FIGS. 1 through 3, the first embodiment of this invention in which a nonmetallic masonry flashing, referred to generally by the reference designator 10, is shown. In this embodiment, a cavity wall structure 12 is shown having an inner wythe 14 of masonry blocks 16 and an outer wythe 18 of facing brick 20. Between the inner wythe 14 and the outer wythe 18, a cavity 22 is formed. Successive bed joints 24 and 26 are formed between courses of blocks 16 and the joints are substantially planar and horizontally disposed. Also, successive bed joints 28 and 30 are formed between courses of bricks 20 and the joints are substantially planar and horizontally disposed. For the surface-mounted flashing installation of this embodiment the flashing 10 is shown extending up to bed joint 26 of the inner wythe 14 and into bed joint 28 of the outer wythe 18.

For purposes of this discussion, the exterior surface 32 of the interior wythe 14 contains a horizontal line or x-axis 34 and an intersecting vertical line or y-axis 36. A horizontal line or z-axis 38 also passes through the coordinate origin formed by the intersecting x- and y-axes. In the discussion which follows, it will be seen that the masonry flashing system 10 of this invention is constructed to completely seal the cavity, to drain water therefrom and to permit air and water vapor to enter and exit through weep holes 40 that are in communication the nonmetallic masonry flashing 10.

Across the cavity 22, in this embodiment, a surface-mounting of the nonmetallic masonry flashing is shown. The flashing 10 includes a polymeric composite membrane 42 having the laminae machine direction disposed in the laminate so as to enhance the tear and tensile strength thereof. The flashing membrane 42 is constructed for emplacement on surface 32 of interior wythe 14 in an x-y plane and for extending across cavity 22 into bed joint 28. The cavity 22, upon installation of the flashing, is sealed thereby. In this preferred mode, it is seen that the polymeric membrane 42 is installed behind insulation 44.

The flashing arrangement of the membrane 42 and the brick outer wythe 20, obviates the need for the customary drip plate; however, if desired one, preferably of stainless steel, may be employed. Weep holes 40 permit any moisture or condensate to drain away from and out of the cavity 22 and permit air and water vapor to enter into and exit from the cavity.

The polymeric composite membrane 42 is a cross laminate from a set of substantially monoaxially oriented thermoplastic polymeric films bonded together in a properly crossed position. Cross-laminates exhibit advantageous properties, in particular, better tear resistance than a single-ply film of the same overall thickness and of the same polymer which has been biaxially oriented. Further, the impact strength and other physical properties of the laminate are improved by annealing at elevated temperature in the range of from 35° to a predetermined level below the melting temperature of the lowest melting of the thermoplastic materials present.

For the purpose of this specification, a cross laminate is defined as two or more substantially monoaxially oriented layers of thermoplastic polymeric film wherein the direction of orientation of each layer is at an angle, preferably 45° to the longitudinal dimension of the laminate and being at an angle, preferably 90° to the direction of orientation of the adjacent layer(s).

The layers of such cross-laminates may be bonded together in any suitable way typically by adhesives, spot-welding, or extrusion lamination. In this, the polymeric composite membrane 42 is a two-layer extrusion formed by two oriented polyolefin films that are bias cut with their directions of strength at right angles to one another. The plies of the laminate may be formed of the same or different polymers and of polymer blends. Suitable thermoplastic polymers for the laminae are, for example, homo- and co-polymers of ethylene, polyolefin, polypropylene, polystyrene, polyvinyl chloride, polyvinylidene chloride, polyvinyl alcohol, and ethylene/vinyl acetate copolymers. The most preferred materials are polyolefin, polypropylene and high density polyethylene.

Referring now to FIGS. 2 and 3 the laminar structure of the uninstalled peel-and-stick flashing membrane 42 is shown. The membrane 42, while being shown in FIG. 1 as a surface-mounted flashing, is suitable for either through-wall or surface mounting and utilizes the pressure-activated adhesive technology for application and extrusion lamination technology for construction. The laminar structure consists of a four-layer arrangement. When viewing the uninstalled membrane 42 from the exposed surface and proceeding toward the mounted surface these layers are:

a. first lamina 44—monoaxial polyolefin (with orientation at approximately 45° to longitudinal axis);

b. second lamina 46—monoaxial polyolefin (with orientation at approx. 135° to longitudinal axis);

c. pressure-activated, hot-melt adhesive, 48 fiber-doped with glass fibers 50; and,     d. release sheet 52 (preferably silicone treated).

and each layer is described in further detail below.

The polymeric composite formed from laminae 44 and 46, besides being bonded together as described above, may also be bonded by adhesives or spot-welding. The most common way of obtaining the criss-crossing relationship between the laminae hereof is to obtain the web of film to be laminated from cutting open longitudinally oriented extruded tubes along a helical line per U.S. Pat. No. 2,953,356.

Referring again to FIG. 2, the peel-and-stick polymeric membrane 42 further includes a hot melt adhesive layers 48 which is formulated for pressure activation and compatibility with the polymeric composites 44 and 46, and the release sheet 52 adhered thereto. The adhesives described herein are particularly useful for peel-and-stick applications in building construction industry as such adhesives are readily pressure activated after the release paper is removed. The adhesive is formulated so that, in case of fire, the coatings thereof will not contribute to smoke or accelerate flame spreading. The adhesive layer 48 includes an inorganic material, namely, an alkali-resistant glass fiber. This additive enhances the adhesive function and provides multidirectional reinforcement. Also, the fiber-doped adhesive layer is formulated to have sufficient tackiness so that a durable bond between the membrane and the rough and porous surface of the masonry block is experienced. The adhesive on the flashing permits lapping of the widths of flashing precluding the use of caulks and sealants at the lapped joints.

Incorporating by reference the Di Rado et al. patent, U.S. Pat. No. 5,106,447, the hot melt adhesive compositions of hot melt layer 56 may be prepared from 10 to 50 weight percent of an isotactic thermoplastic polybutene-1/ethylene copolymer containing from about 5.5 to about 10% by weight ethylene (polybutylene); 20 to 50 percent of a tackifier; 15 to 50 percent of an amorphous diluent having a softening point greater than 90 degrees C.; 0 to 2 percent of a stabilizer; and 0 to 5 percent wax.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of melt index, the applicable isotactic polybutylenes to be used in the present adhesive should exhibit a melt index in the range of from about 5 to 2000 dg/min and preferably from 400 to 700 dg/min. The latter melt flow values are determined by the method described in ASTM D1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80 degrees C. to 150 degrees C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical; (3) aliphatic petroleum hydrocarbon resins having a Ball and Ring softening point of from about 80 degrees C. to 160 degrees C., resulting from polymer-ization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) partially and fully hydrogenated hydrocarbon resins such as Resin H-130 from Eastman, Escorez 5000 series from Exxon, and Regalrez from Hercules. The amorphous diluents which are needed and present in the adhesive composition include (atactic) amorphous polypropylene or other similar high softening point (i.e. greater than 90 degrees C.), low crystalline diluent, (e.g. amorphous polyalpha-olefins). These diluents, are used at levels of 20 to 50% by weight, preferably about 20 to 25% by weight.

To test the degree of tackiness of the above-described flashing structure, a pull test is performed. A cross-laminated polyolefin, 6.5 mil Valeron Strength film, manufactured by Van Leer Flexibles, a unit of Illinois Tool Works 8-inch by 12-inch sample is coated with a hot melt adhesive, namely, APC #915, manufactured by Adhesive Products Company, Indianapolis, Ind. 46235 which hot melt adhesive formulation includes glass fiber and one or more of the aforementioned tackifying resins. A suitable release paper is applied thereover. After a prescribed cure period, the release paper is removed and the flashing of this invention is applied to the surface of a concrete block. The application to the concrete block is at room temperature utilizing a hand-operated laminating roller to provide the pressure activation. A spring scale is then attached to the masonry flashing and a 65 lb. force is required to peel the flashing from the block. Repeating the test for SBS-modified, peel-and-stick flashing, a force of 27 lb. (max.) is required to peel the flashing from the block.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris(3,5-di-tert-butyl-4-hydroxy-benzyl)benzene; pentaerythrityl tetrakis-3(3,5-di-tert-butyl-4-hydroxyphenyl)propionate; 4,4'methylenbis(2,6-tert-butyl-phenol); 4,4'-thiobis (6-tert-butyl-o-cresol); 2,6-di-tertbutylphenol; 6-(4-hydroxy-phenoxy)-2,4-bis(n-octyl-thio)-1,3,5-triazine; di-n-octadecyl 3,5-di-tert-butyl-4-hydroxy-benzylphosphonate; 2-(n-octylthio)-ethyl 3,5-di-tert-butyl-4-hydroxybenzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.0%. It is also possible to add minor amounts (i.e. less than about 5% by weight of the formulation) of other diluents such as (1) waxes including petroleum waxes such as a paraffin wax having a melting point of from about 50 degrees C. to 75 degrees C. and microcrystalline wax having a melting point of from about 60 degrees C. to 90 degrees C.; the latter melting points being determined by ASTM method D127-60; (2) low molecular weight (600 to 3000) liquid polybutene; (3) polyethylene greases having a softening point of from about 80 degrees C. to 100 degrees C. and a hardness value, as determined by ASTM method D-1321, of from about 60 degrees C. to 120 degrees C.; (4) hydrogenated animal, fish and vegetable fats and oil such as hydrogenated tallow, lard, soya oil, cottonseed oil, castor oil, menhaden oil and cod liver oil; and (5) synthetic waxes made by polymerizing carbon monoxide and hydrogen, such as Fischer-Tropsch wax.

Besides the glass fiber reinforcing agent mentioned above, other additives such as flow modifiers, pigments, dyestuffs, etc., which are conventionally added to hot melt adhesives for various end uses may also be incorporated in minor amounts into the formulations of the present invention.

Figure 4:
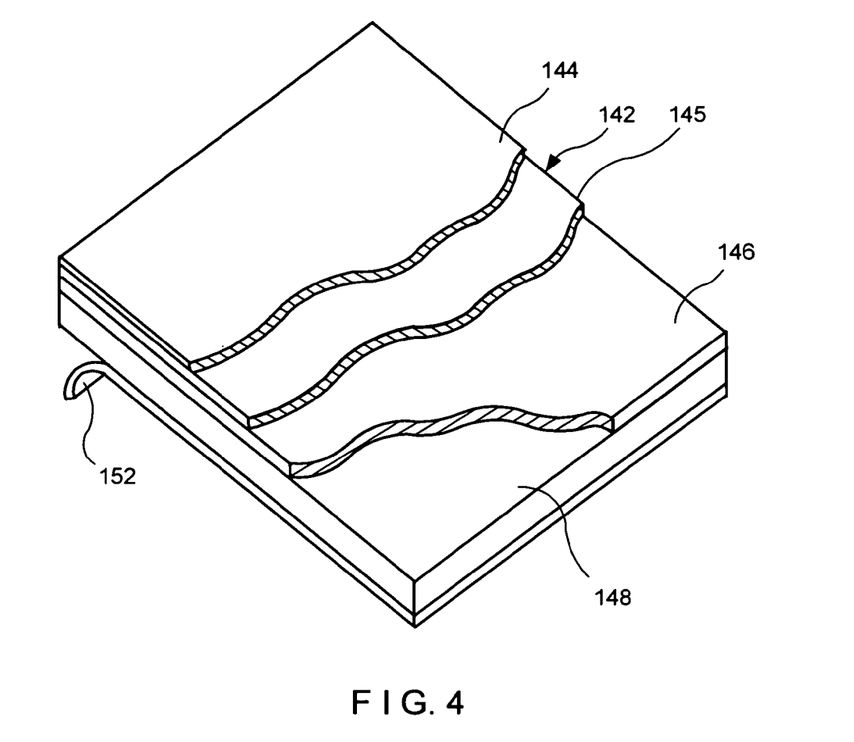
FIG. 4 is a perspective view of the uninstalled peel-and-stick flashing of the second embodiment wherein the flashing is formed from a multilayer, cross-laminated membrane and is shown with successive laminae partially broken away to show details of the structure thereof.
Figure 5:
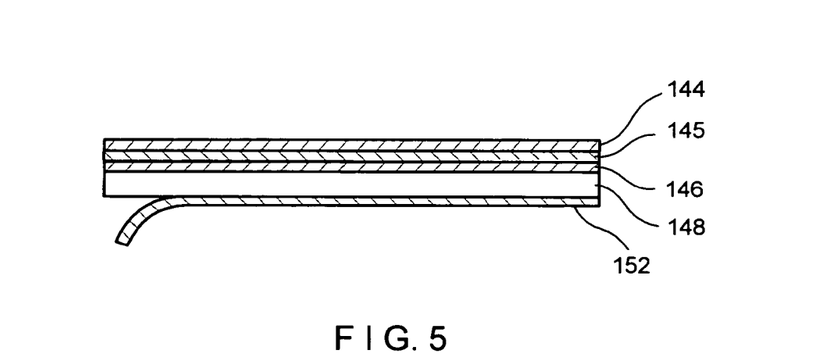
FIG. 5 is a cross-sectional view of the flashing membrane of FIG. 4.

Referring now to FIGS. 4 and 5, the second embodiment of this invention in which a surface-mounted peel-and-stick polymeric membrane, referred to generally by the reference designator 142, is shown. In this embodiment, similar parts to those of the membrane of the first embodiment are referred to by reference designators 100 units higher than a similar part in the first embodiment. Thus, for example, the adhesive layer 48 in the first embodiment has an analogous adhesive layer 148 in the second embodiment.

In showing the additional embodiments hereof, this specification details alternative structures of the flashing membrane and the adhesive layer. Although shown as specific assemblages, any of the membranes shown and described may optionally be employed with any of the adhesive layers. Thus, the embodiments are only exemplary of the scope of the invention.

In this embodiment, another flashing membrane for surface-mounting in a cavity wall is shown. The flashing of the second embodiment includes a three-layer polymeric composite membrane 142. Here the two outer laminae 144 and 146 are extruded onto a preformed center lamina 145. Each of the laminae are monoaxial and are arranged with the outer layers having the direction of orientation thereof at approximately 45° to the longitudinal axis of the web and at 90° to direction of orientation of the preformed center lamina 145.

Consistent with the first embodiment, the flashing arrangement of the membrane 142 and also obviates the need for the customary drip plate; however, if desired one, preferably of stainless steel, may be employed. Similarly, this flashing membrane 142 functions cooperatively with weep holes and thereby permits any moisture or condensate to drain away from and out of the cavity and permits air and water vapor to enter into and exit from the cavity.

The polymeric composite membrane 142 is a multilayer cross laminate from a set of at least three substantially monoaxially oriented thermoplastic polymeric films bonded together in a properly crossed position. Multilayer laminates exhibit similar advantageous properties as the two-layer cross-laminates, and, in particular, better tear resistance than a single-ply film of the same overall thickness and of the same polymer which has been biaxially oriented.

Typically the multilayer cross-laminate structures are bonded together by extrusion lamination. In this process, a preformed center lamina 145 has the two outer layers 144 and 146 with parallel direction of orientation run through the extruder at right angles to the direction of orientation of the intermediate lamina 145. The plies of the laminate may be formed of the same or different polymers and of polymer blends. As in the prior embodiment, suitable thermoplastic polymers for the laminae are, for example, homo- and co-polymers of ethylene, polyolefin, polypropylene, polystyrene, polyvinyl chloride, polyvinylidene chloride, polyvinyl alcohol, and ethylene/vinyl acetate copolymers. The most preferred materials are polyolefin, polypropylene and high density polyethylene.

Referring now to FIGS. 4 and 5 the laminar structure of the uninstalled peel-and-stick flashing membrane 142 is shown. The membrane 142, while provided as a surface-mounted flashing, is adaptable for through-wall mounting and utilizes the pressure-activated adhesive technology for application and extrusion lamination technology for construction. The laminar structure consists of a five-layer arrangement. When viewing the uninstalled membrane 142 from the exposed surface and proceeding toward the mounted surface these layers are:

a. first outer lamina 144—monoaxial ethylene/vinyl acetate (EVA) (with orientation at approximately 45° to longitudinal axis);

b. preformed center lamina 145—monoaxial EVA (with orientation at approx. 135° to longitudinal axis);

c. second outer lamina 146—monoaxial EVA (with orientation at approx. 45° to longitudinal axis);

d. adhesive layer 148—an admixture of a hot-melt adhesive and a butylated adhesive 148; and, e. release sheet 152 (preferably silicone treated).

and each layer is described in further detail below.

The adhesive layer 148 of the second embodiment is an admixture of a hot melt adhesive (adapted as described above for sufficient tack) and a butylated adhesive. The latter is present in the total mixture in the range of 5 to 40 percent. In the present case, a 75 percent hot melt adhesive and a 25 percent butylated adhesive mixture provided a non-drool adhesive layer 148 which, upon curing, has a melting point of 225° F. This aspect satisfied the stability requirement when the melting point was above 200° F.

Figure 6:
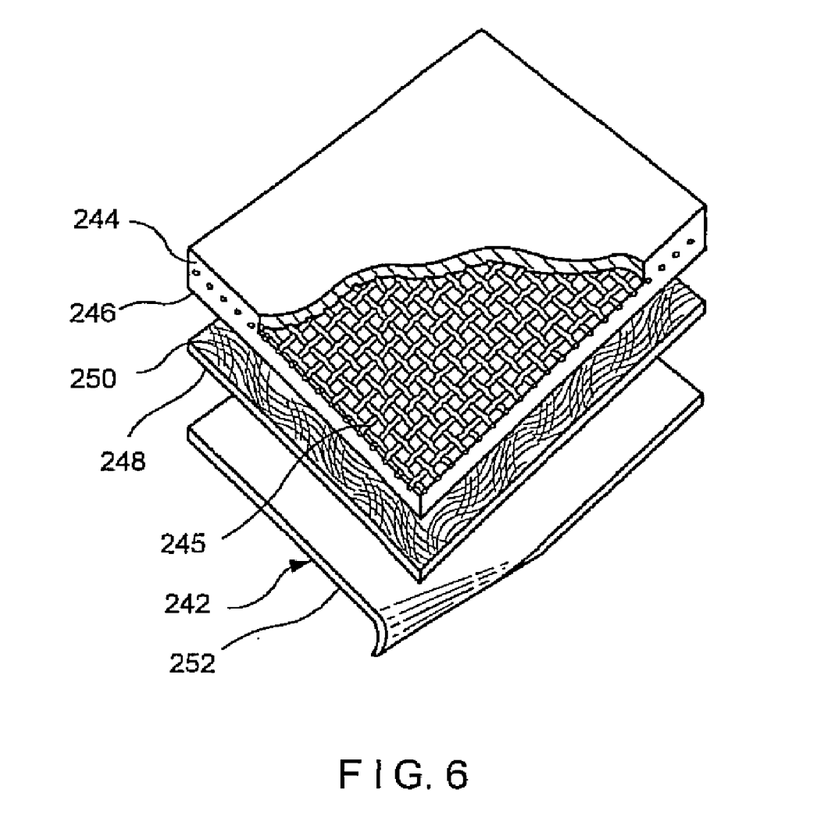
FIG. 6 and FIG. 7 are a perspective view and a cross-sectional view, respectively, of the uninstalled peel-and-stick flashing of the third embodiment wherein the flashing is formed from a high-density polyethylene scrim with a low-density polyethylene coating on both sides and is shown with the uppermost lamina partially broken away to show details of the structure thereof.
Figure 7:
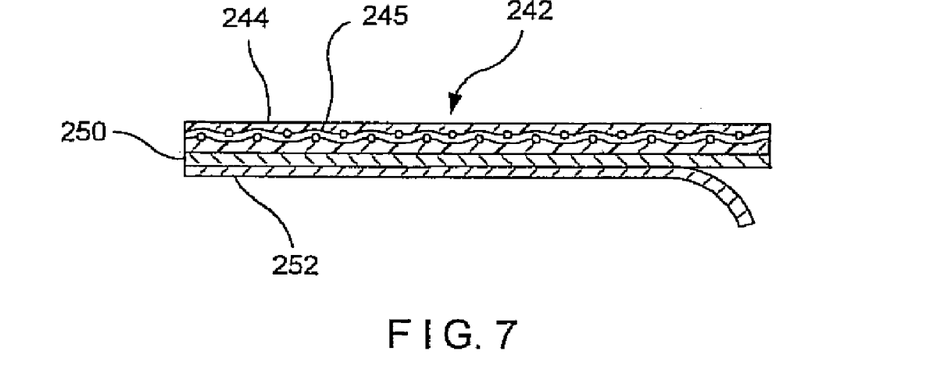

Referring now to FIGS. 6 and 7, the third embodiment of this invention in which a surface-mounted peel-and-stick polymeric membrane, referred to generally by the reference designator 242, is shown. In this embodiment, similar parts to those of the first embodiment are referred to by reference designators 200 units higher than a similar part in the first embodiment. Thus, for example, the adhesive layer 48 in the first embodiment has an analogous adhesive layer 248 in the third embodiment.

In the third embodiment, an alternative flashing membrane for surface mounting in a cavity wall is shown. The flashing of the third embodiment includes a three-layer composite membrane 242. In this instance, a woven high-density polyethylene scrim 245 has bonded to either side thereof outer laminae 244 and 246 formed from low density polyethylene. Although a woven scrim is shown, a nonwoven scrim is optional utilizable. Here the hot melt adhesive 248 is similar to that used in the first embodiment; however, in lieu of fiber glass a doping with filamentous fragments of polypropylene 250 is employed to provide multidirectional reinforcements.

As in the other embodiments, the flashing arrangement of the membranes 242 also obviates the need for the customary drip plate; however, if desired one, preferably of stainless steel, may be employed. Weep holes of the cavity wall permit any moisture or condensate to drain away from and out of the cavity and permit air and water vapor to enter into and exit from the cavity.

Referring now to FIGS. 6 and 7 the laminar structure of the uninstalled peel-and-stick flashing membrane 242 is shown. The membrane 242, while provided as a surface-mounted flashing, is adaptable for through-wall mounting and utilizes the pressure-activated adhesive technology for application and extrusion lamination technology for construction. The laminar structure consists of a five-layer arrangement. When viewing the uninstalled membrane 242 from the exposed surface and proceeding toward the mounted surface these layers are:

a. first outer lamina 244—low-density polyethylene (LDPE) coating;

b. encapsulated scrim 245—woven, high-density polyethylene (HDPE);

c. second outer lamina 246—LDPE coating;

d. pressure-activated, hot-melt adhesive, 248 fiber-doped with polypropylene 250; and, d. release sheet 252 (preferably silicone treated).

In the description of the preferred embodiments supra, membranes are shown wherein the strength depends on the direction of orientation of the component films and wherein the strength depends on the scrim core. The membranes hereof receive reinforcement from adhesive layers doped with glass fibers or polypropylene filamentous fragments. It is within the contemplation of this invention that any of the laminates hereof is usable with any of the adhesive layers.

What is claimed is:

1. A nonmetallic masonry flashing for use in a cavity of a cavity wall, said cavity wall having an inner wythe of masonry block and an outer wythe, said nonmetallic masonry flashing comprising, in combination:
   a high-strength polymeric membrane, having two major surfaces, said membrane, in turn, comprising:
   three laminae, each coextensive with one another, and securely attached to one another with a preformed polymeric web interposed between two outer polymeric webs, said preformed polymeric web is a monoaxially oriented plastic film and, upon lamination between said two outer polymeric webs, has the direction of orientation thereof substantially at 90° to the direction of orientation of said two outer polymeric webs;
   an adhesive layer disposed on one of said major surfaces of said membrane; and,
   a release sheet disposed on said adhesive layer, said release sheet being removable prior to mounting said masonry flashing in said cavity of said cavity wall.

2. A nonmetallic masonry flashing as described in claim 1 wherein said preformed polymeric web is a scrim selected from a group consisting of a woven web and a nonwoven web.

3. A nonmetallic masonry flashing as described in claim 1 wherein said preformed polymeric web and said outer polymeric webs are of thermoplastic polymers selected from the group consisting of homo- and co-polymers of ethylene, polyolefin, polypropylene, polystyrene, polyvinyl chloride, polyvinylidene chloride, polyvinyl alcohol, and ethylene/vinyl acetate copolymers and blends thereof.

4. A nonmetallic masonry flashing as described in claim 1 wherein said adhesive layer is a pressure-activate, hot melt adhesive with sufficient tack to adhere said masonry flashing to the surface of said masonry block of said inner wythe.

5. A nonmetallic masonry flashing as described in claim 4 wherein said hot melt adhesive comprises about 10 to 50 percent by weight of an isotactic thermoplastic, about 5.5 to 10 percent by weight of ethylene, about 20 to 50 percent of a tackifier resin; 15 to 50 percent by weight of an amorphous diluent; 0 to 2 percent by weight of a stabilizer; and 0 to 5 percent by weight of wax.

6. A nonmetallic masonry flashing as described in claim 4 wherein each said adhesive layer further comprises:
   a fibrous additive portion of filamentous fragments, said fibrous additive portion providing multidirectional reinforcement to said masonry flashing.

7. A nonmetallic masonry flashing as described in claim 4 wherein said adhesive layer further comprises:
   a butylated adhesive portion admixed with said hot melt adhesive, said butylated adhesive forming between 5 and 40 percent thereof while maintaining the melting point of the cured adhesive above 200° F.

8. A nonmetallic masonry flashing for use in a cavity wall, said cavity wall having an inner wythe of masonry block and an outer wythe, said nonmetallic masonry flashing comprising, in combination:
   a high-strength polymeric membrane formed from laminations of thermoplastic films, said membrane having two major surfaces;
   an adhesive layer disposed on one of said major surfaces of said membrane, said adhesive layer, in turn, comprising:
      a hot melt adhesive portion being pressure activatable with sufficient tack to adhere said masonry flashing to the surface of said masonry block of said inner wythe;
      a fibrous additive portion of said adhesive layer providing multidirectional reinforcement for said masonry flashing; and, a release sheet disposed on said adhesive layer, said release sheet being removable prior to mounting said masonry flashing in said cavity of said cavity wall.

9. A nonmetallic masonry flashing as described in claim 8 wherein said hot melt adhesive comprises about 10 to 50 percent by weight of an isotactic thermoplastic, about 5.5 to 10 percent by weight of ethylene, about 20 to 50 percent of a tackifier resin; 15 to 50 percent by weight of an amorphous diluent; 0 to 2 percent by weight of a stabilizer; and 0 to 5 percent by weight of wax.

10. A nonmetallic masonry flashing as described in claim 9 wherein said membrane is a cross-laminate of two substantially monoaxially oriented plastic films with the direction of orientation of one film substantially at 90° to the direction of orientation of the other.

11. A nonmetallic masonry flashing as described in claim 10 wherein said membrane is a three layer laminate having a preformed polymeric web interposed between two outer polymeric webs.

12. A nonmetallic masonry flashing as described in claim 11 wherein said preformed polymeric web is a scrim selected from a group consisting of a woven web and a nonwoven web.

13. A nonmetallic masonry flashing as described in claim 11 wherein said preformed polymeric web is a monoaxially oriented plastic film and, upon lamination between said two outer polymeric webs, has the direction of orientation thereof substantially at 90° to the direction of orientation of said two outer polymeric webs.

14. A nonmetallic masonry flashing as described in claim 11 wherein said preformed polymeric web and said outer polymeric webs are of thermoplastic polymers selected from the group consisting of homo- and co-polymers of ethylene, polyolefin, polypropylene, polystyrene, polyvinyl chloride, polyvinylidene chloride, polyvinyl alcohol, and ethylene/vinyl acetate copolymers and blends thereof.

15. A nonmetallic masonry flashing as described in claim 8 wherein said membrane is formed from two laminae each coextensive with the other and securely attached to each other.

16. A nonmetallic masonry flashing as for use in a cavity wall, said cavity wall having an inner wythe of masonry block and an outer wythe, said nonmetallic masonry flashing comprising, in combination:
   a cross-laminated polymeric membrane having two major surfaces, said membrane, in turn, comprising:
      at least two laminae, each coextensive with the other laminae and securely attached to the adjacent laminae, each of said laminae being a monoaxially oriented plastic film and being disposed in said membrane with the direction of orientation thereof at 90° to the direction of orientation of adjacent laminae;
   an adhesive layer disposed on one of said major surfaces of said membrane; and
   a release sheet disposed on said adhesive layer, said release sheet being removable prior to mounting said masonry flashing on said cavity of said cavity wall.

17. A nonmetallic masonry flashing as described in claim 16 wherein said adhesive layer further comprises:
   a butylated adhesive portion admixed with said hot melt adhesive, said butylated adhesive forming between 5 and 40 percent thereof while maintaining the melting point of the cured adhesive above 200° F.

* * * * *